(12) United States Patent
Bryant et al.

(10) Patent No.: US 10,805,686 B2
(45) Date of Patent: Oct. 13, 2020

(54) SYSTEMS AND METHODS FOR GENERATING A MEDIA-BASED RESULT TO AN AMBIGUOUS QUERY

(71) Applicant: Rovi Guides, Inc., San Jose, CA (US)

(72) Inventors: Stuart Bryant, Datchet (GB); Aaron James Biggs, Reading (GB); Penelope Jane Warburg, Leatherhead (GB); Sallianne E. Sorget, Eureka, MO (US); Michael Galante, Reading (GB); Corey Tulis, Portland, OR (US)

(73) Assignee: Rovi Guides, Inc., San Jose, CA (US)

( * ) Notice: Subject to any disclaimer, the term of this patent is extended or adjusted under 35 U.S.C. 154(b) by 113 days.

(21) Appl. No.: 16/118,191

(22) Filed: Aug. 30, 2018

(65) Prior Publication Data
US 2020/0077155 A1   Mar. 5, 2020

(51) Int. Cl.
| | |
|---|---|
| *H04N 21/482* | (2011.01) |
| *G10L 15/18* | (2013.01) |
| *H04N 21/44* | (2011.01) |
| *H04N 21/442* | (2011.01) |
| *G06F 16/732* | (2019.01) |
| *H04N 21/431* | (2011.01) |
| *H04N 21/45* | (2011.01) |
| *G06F 16/738* | (2019.01) |
| *G06F 16/735* | (2019.01) |
| *H04N 21/845* | (2011.01) |

(52) U.S. Cl.
CPC ....... *H04N 21/4828* (2013.01); *G06F 16/732* (2019.01); *G06F 16/735* (2019.01); *G06F 16/738* (2019.01); *G10L 15/1822* (2013.01); *H04N 21/4316* (2013.01); *H04N 21/44008* (2013.01); *H04N 21/44213* (2013.01); *H04N 21/4532* (2013.01); *H04N 21/8455* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2007/0061363 A1* | 3/2007 | Ramer ............. G06Q 30/02 |
| 2010/0153885 A1 | 6/2010 | Yates |

(Continued)

*Primary Examiner* — Jason K Lin
(74) *Attorney, Agent, or Firm* — Haley Guiliano LLP

(57) ABSTRACT

Systems and methods are described herein for providing a search result based on an ambiguous voice query. The system comprises receiving an ambiguous voice query relating to an object from a user, retrieving a viewing history of the user for about a list of media assets viewed by the user, determining, from the list of media asset, a media asset that is likely to contain the object based at least in part on metadata of the media asset and the ambiguous voice query, searching content of the determined media asset to identify a segment within the media asset that contains the object, and generating a display of information about the object identified from the segment.

14 Claims, 11 Drawing Sheets

(56) References Cited

U.S. PATENT DOCUMENTS

| | | | | |
|---|---|---|---|---|
| 2011/0078055 A1* | 3/2011 | Faribault | .............. | G06Q 30/02 705/27.2 |
| 2012/0233641 A1* | 9/2012 | Gambino | .......... | G06Q 30/0277 725/60 |
| 2012/0278844 A1* | 11/2012 | Curtis | .............. | H04N 21/4147 725/93 |
| 2012/0315009 A1* | 12/2012 | Evans | ............. | H04N 21/41407 386/230 |
| 2016/0011743 A1* | 1/2016 | Fundament | .......... | G06F 3/0482 715/716 |
| 2016/0314158 A1* | 10/2016 | Kelly | .................. | G06F 16/367 |
| 2018/0150559 A1* | 5/2018 | Ahuja | .................. | G06F 16/951 |
| 2019/0272358 A1* | 9/2019 | McCoskey | ....... | H04N 21/25808 |

* cited by examiner

SYSTEMS AND METHODS FOR GENERATING A MEDIA-BASED RESULT TO AN AMBIGUOUS QUERY

BACKGROUND OF THE INVENTION

Some existing media systems may perform a search to identify an object related to a media asset a user may be viewing at a particular time. For example, the user may inquire about an actor that is part of the media asset the user is watching. For example, conventional media systems may receive and process a query identifying at least the title of a media asset, an actor name, a director name, and/or the like to perform a search on a media asset. A complete query may require different components like (1) an object identifier, (2) a media asset identifier and more to be able to comprehensively answer a query provided by the user. However, conventional media systems are unable to parse ambiguous queries such as a vague reference to "the blue heels I just saw from a movie", that does not contain a definite identifier to any media asset.

SUMMARY

The advancement of digital transmission of media content has increased the amount of data that can be transmitted. For example, high definition media assets usually involve a large volume of video data to be delivered from a media source to user equipment for display. In particular, media systems may transmit metadata that includes detailed information about media content. This metadata may include descriptions and tags to important events within the media asset. While this information, by itself, is not useable for displaying to a human user, computer processors can read and interpret this information. However, while computer processors may read and interpret this information, and generate media content for display that may be useable by a human user (e.g., output media content in response to a query), these systems still fail to solve the aforementioned problem when implemented in computer systems because as discussed above, these computer systems can only perform a search of a media asset based on definitive identifying information of the media asset.

Accordingly, to overcome the problems created when performing a search to respond to an ambiguous query, systems and methods are disclosed herein for identifying a media asset based on an ambiguous search indicator provided by a user.

Specifically, the media guidance application may monitor a vocal conversation from a user, e.g., the media guidance application may receive a vocal input from a user. In some embodiments, the vocal input may be in the form of a query that may identify a part of a media asset or an object. The media guidance application may detect an ambiguous query indicative of an object from the vocal conversation and parse the ambiguous query, to determine a term. For example, the media guidance application may parse the received query to determine a plurality of keywords of the ambiguous query. For example, the media guidance application may receive a query of the form "Tell me about the dress Kate Winslet wore." In this example, the query does not include a reference to any particular media asset. Kate Winslet has acted in a variety of movies and worn several dresses in each of such movies. The media guidance application may parse the query to determine keywords associated with the query. In this example, keywords associated with the query may be "dress" or "Kate Winslet." The media guidance application may select any one of the keywords as the term. In some examples, the term may include all the keywords.

The term is then used to determine whether the query refers to a media asset. The media guidance application may transmit a query, to a data source, based on the determined term. In some examples, the data source may be remote with respect to the media guidance application. In some embodiments, the data source may be stored in memory along with the media guidance application. In some examples, the data source may contain a plurality of media assets stored. The media guidance application, in response to the query, may determine whether the ambiguous query relates to one or more media assets. In such examples, the media guidance application may also record media assets differently in the database that have been watched or recorded by the user. The media guidance application, in response to determining that the ambiguous query relates to the one or more media assets, may retrieve a viewing history of the user. For example, the media guidance application, may retrieve from the database, a viewing history associated with the user. From the viewing history, the media guidance application may identify a media asset that the user has viewed from one or more media assets based on the viewing history. In some examples, the viewing history of the user may be stored at the database, and the media guidance application may receive the viewing history from the database. In such examples, the media guidance application may retrieve the actual media assets that are part of the viewing history for processing.

In some examples, the media guidance application may process each media asset that is part of the viewing history of the user to determine whether the ambiguous query refers to that media asset. The media guidance application generates a plurality of video frames from the identified media asset. For example, the media guidance application, for each media asset, may split the media asset into a plurality of frames. The media guidance application may perform image analysis on each such frame part of the media asset to determine the objects that are part of the frame. For example, the media guidance application may perform edge detection on each frame to determine the contents of the frame.

The media guidance application may determine whether one of the plurality of video frames contains the object indicated in the ambiguous query. For example, the media guidance application may search the frame to determine whether the frame contains objects that are part of the term. In such examples, the media guidance application may search for "Kate Winslet" and "dress" in each frame of the media asset. In response to determining that at least one video frame contains the object, the media guidance application may determine a media asset segment containing the at least one video frame from the media asset. The media guidance application may obtain information relating to the object and the media asset segment based at least in part on metadata corresponding to the media asset segment, and generates for display, the media asset segment containing at least one video frame and information relating to the object. For example, the media guidance application may pick out a frame of a media asset that includes "Kate Winslet," and a "dress" i.e., elements that are part of the term. Upon determining the presence of the of the object, the media guidance application may determine from the frame, a segment of the media asset that includes the frame of the object. In such examples, the media guidance application may determine information related to the object and display the information to the user along with the segment of the media asset that includes the object.

In some embodiments, the media guidance application may transmit a query based on the term to a media asset database storing media assets and metadata associated with the media assets and receives from the media asset database storing media assets, a result of the query. For example, as described above, the media guidance application may generate a query based on the term including "Kate Winslet" and "dress" and transmit the generated query to the database. In such examples, the media guidance application may receive a result of the query from the database. The media guidance application may determine, based on the result of the query, whether the term matches metadata corresponding to one or more media assets, and in response to determining that the term matches metadata corresponding to one or more media assets, the media guidance application may determine that the ambiguous query relates to one or more media assets. In such examples, the media guidance application may determine whether the term "Kate Winslet" or "dress" match metadata of any media asset that was retrieved from the database, the media guidance application may determine that the query including the term relates to a media asset present in the database that the user has watched before.

In some embodiments, in response to determining that the term does not match metadata corresponding to one or more media assets, the media guidance application determines from a profile associated with the user, a social network associated with the user, and the media guidance application searches through the social network associated with the user, a plurality of trending topics. In such examples, if the media guidance application determines that the term is not related to any media asset in the viewing history of the user retrieved from the database. In such examples, the media guidance application may determine a social network associated with the user (e.g., Facebook, Twitter), and may search the account of the user on the determined social network for a plurality of trending topics on the network. In some examples, the trending topics may be extracted by the media guidance application from the social network. In some examples, the media guidance application may conduct a search of trending topics on the social network. The media guidance application may compare the term to the plurality of trending topics, and determine based on the comparison, whether the term matches a trending topic in the plurality of trending topics. In such example, the media guidance application may compare the keywords part of the term such as "Kate Winslet" and "dress" to the trending topics extracted by the media guidance application.

In some embodiments, the media guidance application, in response to determining that the term matches a trending topic in the plurality of trending topics, identifying an additional media asset associated with the trending topic. For example, the media guidance application may determine that the trending topics discuss the movie "Titanic" that stars "Kate Winslet." Therefore, the media guidance application selects the movie "Titanic" as the additional media asset.

In response to determining that the term does not match a trending topic in the plurality of trending topics, the media guidance application may transmit the term to a knowledge graph having a plurality of nodes representing different pieces of information and a plurality of edges connecting the plurality of nodes representing relationships between the different pieces of information. In some embodiments, the media guidance application may identify a first node representing the term on the knowledge graph; searching, starting from the first node on the knowledge graph, for a second node representing media asset related information.

The media guidance application may determine a distance between the first node and the second node, and compares the distance between the first node and the second node with a pre-defined threshold. In response to determining that the distance is below the pre-defined threshold, the media guidance application identifies a media asset relating to the media asset related information from the second node, and determines the ambiguous voice query is related to the media asset. For example, a knowledge graph may contain nodes that relate media assets to various elements, such as actors, objects, locations, themes, genres, among other topics. The distance between the different nodes in the knowledge graph may represent a degree of closeness between the two nodes. For example, the media guidance application may determine that the distance between the node of the movie "Titanic" and the node of the actor "Kate Winslet" may be one node. In such examples, the distance between the node "Titanic" and "dress" may be 3 nodes. In such examples, if the threshold is 2 nodes, the "dress" node may not be closely related to the "Titanic" node. However, the node of "Kate Winslet" is only one node away from the node "Titanic" and therefore may determine that the node of "Kate Winslet" is related to the media asset of "Titanic."

The media guidance application determines a start time and end time of a segment of media asset associated with the object. In some embodiments, the media guidance application searches, starting at the beginning of the media asset, for a first video frame that contains the object and determines a starting playback position corresponding to the first video frame. In some examples, the media guidance application detects a starting time of the media asset and stores the starting time. In some embodiments, the media guidance application searches, for a second video frame that is a last instance in which the object continuous appears since the starting playback position, and determines an ending playback position corresponding to the second video frame. In some examples, the media guidance application detects a time of the last frame of the media asset and stores the time of the last frame.

In some embodiments, the media guidance application may determine, from the metadata corresponding to the additional media asset, a keyword associated with the object. The media guidance application may generate a search query based on the keyword, and may transmit the search query to a data source to obtain information related to the object. For example, the media guidance application may generate a query based on the keywords related to the object. In such examples, the media guidance application may determine a query using the terms "Kate Winslet," and "dress" using query identifiers. In such examples the media guidance application executes the search query over the internet to determine information related to the object.

The information that is determined about the object is displayed on a user device displaying the media asset. The media guidance application determines a position of the object within at least one video frame, and generates for display, an overlay containing the information relating to the object at the position of the object. In such examples, the media guidance application may determine a position of the dress in a frame of the movie "Titanic" and may display the retrieved information regarding the dress next to the display of "Kate Winslet" and the "dress."

The media guidance application may also use additional information like the user's location to filter the viewing history of the user. In some embodiments, the media guidance application may determine a location of the user at the time of the vocal conversation. For example, the media guidance application may receive a vocal conversation from the user at a particular location (e.g., "Central Park") about a media asset that was shot there. The media guidance application may determine the location of the user from the device the user is using for recording the conversation. In some embodiments, the media guidance application adds the determined location of the user to the term to generate a second term. In such examples, the media guidance application generates a second query that includes the location. The media guidance application may filter the plurality of media assets based on the second term.

In some embodiments, the media guidance application may determine from a profile associated with the user, that a second object that is related to the user, wherein the second object shares a common attribute with the object, the media guidance application searches through user generated media in a period of time to retrieve a set of media that corresponds to the second object. The media guidance application performs an image comparison between the set of media that corresponds to the second object and the object, and generates for display, a comparative view of the second object and the object. For example, the media guidance application may determine that the object that is determined may be already purchased by the user previously. In such examples, the media guidance application may determine from a purchase history associated with the user that the user has purchased the object. When the media guidance application determines that the user has purchased the object, the media guidance application generates a comparative view of the object purchased by the user and the object shown in the media asset.

In some aspects, the media guidance application may provide a search result in response to an ambiguous voice query based on content analysis of media assets that a user has been exposed to. The media guidance application may detect, an ambiguous query indicative of an object of interest to the user. For example, the media guidance application, while running on a user device, may receive a query from a user of the form "Tell me about Leonardo DiCaprio's car". In some examples, the media guidance application may receive a stream of conversation from a user associated with the media guidance application and may filter the stream of conversation to detect a query directed at the media guidance application.

In order to determine a context of the ambiguous query, the media guidance application may split the ambiguous query into a plurality of terms. For example, the media guidance application may split the query "Tell me about Leonardo DiCaprio's car" into "Leonardo DiCaprio", "car", and "tell".

These terms may then be compared to entries in a database to determine whether they correspond to an object identifier. The media guidance application may determine whether a term in the plurality of terms matches an entry in a plurality of entries that are stored at a data source, wherein each entry in the plurality of entries comprises a term of the plurality of terms and a corresponding object identifier. For example, the media guidance application may compare the terms "Leonardo DiCaprio", "car", and "tell" to a database to determine object identifiers associated with such terms. In this example, the term "car" may have an object identifier of "vehicle" associated with it. Similarly, the term "tell" may have the identifier "search" associated with it.

Using the identifiers, the media guidance application may convert the ambiguous natural language query received from the user to a a computer system query for processing. The media guidance application may generate a query of the object, wherein the query includes object identifiers of entries that match terms in the plurality of terms. In such examples, the media guidance application may generate a query "search Leonardo DiCaprio vehicle" from the ambiguous query.

The media guidance application may transmit the query to a data source. The data source may contain metadata associated with media assets that are available. In some examples, the data source may be a database provided by a service provider (e.g. Amazon video, Netflix, Time Warner) that includes media assets. The media guidance application may transmit the query to the data source. The media guidance application may prompt the data source to search through the metadata of available media assets to determine whether the metadata includes terms related to "Leonardo DiCaprio" and "vehicle".

After the searching, the media guidance application may receive results of the search from the datastore. The media guidance application may receive, from the data source, a result of the query, wherein the result includes media asset identifiers. The result of the query may include identifiers of media assets, that contain metadata that matches the terms of the query generated and transmitted by the media guidance application. For example, the media guidance application may receive from the data store, identifiers for the movies "Titanic", "The Great Gatsby", "Wolf of Wall Street", and "Revenant".

Using the results from the data store, the media guidance application may determine whether the query was related to a media asset. In such examples, if the query media guidance application does not receive any media asset identifiers as part of the results, the media guidance application may determine that the query is not related to a media asset. The media guidance application may determine, based on the result of the query, whether the ambiguous query relates to one or more media assets. For example, on receiving the identifiers for the movies "Titanic", "The Great Gatsby", "Wolf of Wall Street", and "Revenant", the media guidance application may determine that the query is related to a media asset.

Upon determining that the query relates to a media asset, the media guidance application will search through the user's history to determine whether the user has viewed any media asset related to the query. The media guidance application, in response to determining that the ambiguous query relates to the one or more media assets, retrieving a viewing history of the user, determining whether the viewing history includes any of the one or more media assets. For example, the media guidance application may search the user's viewing history to determine whether the user has watched any of "Titanic", "The Great Gatsby", "Wolf of Wall Street", and "Revenant".

Upon determining that the user has watched any one of the media assets, the media guidance application may focus the search of the object of the query in the media asset viewed by the user. In response to determining that the that the viewing history includes any of the one or more media assets, the media guidance application may determine from the viewing history, a media asset that is part of the one or more media assets. For example, the media guidance application may determine that the user has viewed "The Great Gatsby" from the list of search results.

The media guidance may search, each frame of the media asset for the object, determine, based on the searching, a plurality of frames that include the object. For example, the media guidance application may search through each frame of the movie "The Great Gatsby" for "Leonardo DiCarpio"

and a "car". In some examples, Leonardo DiCaprio may be driving a car, in some other examples, he just may be sitting in a car.

Using the segments of Leonardo DiCaprio and car from "The Great Gatsby", the media guidance application may form a segment of the movie. The media guidance application may form, based on the determined plurality of frames, a segment of the media asset that includes the object, and generate for display, an indication of the segment of the media asset segment containing the object.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for identifying a media asset or an object that appears in a media asset based on an ambiguous search indicator provided by a user. For example, if the user queries "tell me about that dress that Rose wore I just saw in the movie," conventional media systems may not be able to determine an answer to the query as the "dress" may not be enough to search for the object being referred by the user. The claimed invention attempts to solve this problem by parsing the query to extract keywords associated with the query like "dress," "Rose," and "movie". The claimed invention may determine, from a viewing history associated with the user, a media asset that includes metadata corresponding to the keywords. From the media asset, the media guidance application may determine, from video frame analysis of the media asset, the claimed invention may determine which frames of the media asset include the object being referred by the user.

Figure 1:
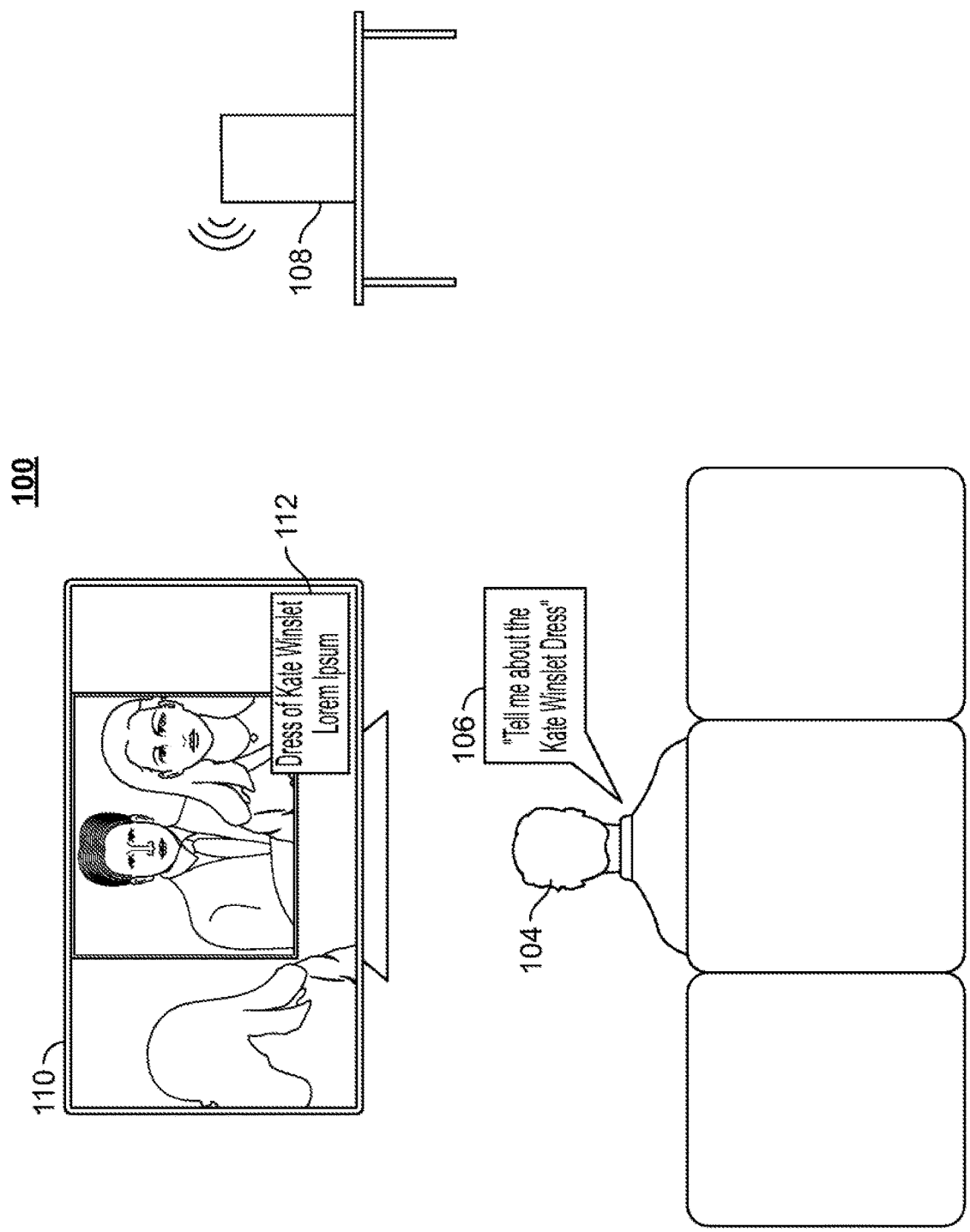
FIG. 1 shows an illustrative example of responding to an ambiguous query received from a user, in accordance with some embodiments of the disclosure.

FIG. 1 shows an illustrative example of responding to an ambiguous query received from a user, in accordance with some embodiments of the disclosure. FIG. 1 shows a user equipment device 102 that is displaying a first media asset 110. The media guidance application may receive an ambiguous query 106 from a user 104. In some embodiments, the vocal conversation from the user may be received at a remote assistant device 108 where the remote assistant device 108 runs an instance of the media guidance application. In some embodiments, the media guidance application may record user conversations at the user equipment device 102.

In some embodiments, the user equipment device 102 may be turned off and the recorded conversation may be received by media guidance application running on the remote assistance device 108. Upon determining a response to the vocal input 106 received, the media guidance application may provide a response to the query via remote assistant device 108. In some embodiments, the media guidance application may start the user equipment device 102 to display the result of the vocal input 106. In some embodiments, the remote assistant device 108 may be connected to user equipment device 102 via a network.

Specifically, the media guidance application may monitor a vocal conversation from a user, e.g., the media guidance application may receive the vocal input 106 from a user. In some embodiments, the vocal input 106 may be in the form of an ambiguous query that may identify a part of a media asset or an object. For the purposes of the disclosure, ambiguous query and vocal input may be used interchangeably. The media guidance application may detect an ambiguous query 108 indicative of an object from the vocal conversation and parse the ambiguous query, to determine a term. For example, the media guidance application may record the conversation and identify a question/query 108 from the conversation, e.g., by analyzing content and tone of the conversation. The media guidance may then parse the received query 108 to determine a plurality of keywords of the query. For example, the media guidance application may receive a query of the form "Tell me about the dress Kate Winslet wore." In this example, the query does not include a reference to any particular media asset. Kate Winslet has acted in a variety of movies and worn several dresses in each of such movies. The media guidance application may parse the query 106 to determine keywords associated with the query 106. In this example, keywords associated with the query 106 may be "dress" or "Kate Winslet". The media guidance application may select any one of the keywords as the term. In some examples, the term may include all the keywords.

The term is then used to determine whether the query 106 refers to a media asset. The media guidance application may transmit the query 106, to a data source, based on the determined term. In some examples, the data source may be remote with respect to the media guidance application. In some embodiments, the data source may be stored in memory along with the media guidance application. In some examples, the data source may contain a plurality of media assets stored. The media guidance application, in response to the query, may determine whether the ambiguous query 106 relates to one or more media assets. In such examples, the media guidance application may also record media assets differently in the database that have been watched or recorded by the user. In such examples, one of the term that could identify whether the query 106 was related to a media asset 110, is the term "Kate Winslet." As "Kate Winslet" is an actor, the term, when sent to the database, may determine that the query 106 may be related to a media asset 110.

In such examples, when the media guidance application transmits query 106 to the database, the media guidance application may receive a result of the query 106 from the database. The media guidance application may determine, based on the result of the query 106, whether the term matches metadata corresponding to the one or more media assets, and in response to determining that the term matches metadata corresponding to the one or more media assets, the media guidance application may determine that the ambiguous query 106 relates to one or more media assets. In such examples, the media guidance application may determine whether the term "Kate Winslet" or "dress" match metadata of any media asset that was retrieved from the database, the media guidance application may determine that the query including the term relates to a media asset present in the database that the user has watched before. As discussed above, upon reviewing the viewing history of the user within a predetermined period in the past, the media guidance application may determine that the term "Kate Winslet" is associated with the metadata associated with two media assets "Titanic" and "Jobs."

In case the term does not refer to a media asset from the user's history, the media guidance application may move to other content sources, e.g. social media. In some embodiments, in response to determining that the term does not match metadata corresponding to one or more media assets, e.g., when the ambiguous query merely includes "the blue heels I just saw in the movie," the media guidance application may use social media information to find any trending topics that may provide information about the ambiguous query. Specifically, the media guidance application determines from a profile associated with the user, a social network associated with the user, and the media guidance application searches through the social network associated with the user, a plurality of trending topics. In such examples, if the media guidance application determines that the term is not related to any media asset in the viewing history of the user retrieved from the database. In such examples, the media guidance application may determine a social network associated with the user (e.g., Facebook, Twitter), and may search the account of the user on the determined social network for a plurality of trending topics on the network. In some examples, the trending topics may be extracted by the media guidance application from the social network. In such examples, there may be a trending topic related to "Kate Winslet." In such examples, the topic may relate to the auction of her dress from the movie "Titanic." In some examples, the media guidance application may conduct a search of trending topics on the social network. The media guidance application may compare the term to the plurality of trending topics, and determine based on the comparison, whether the term matches a trending topic in the plurality of trending topics. In such example, the media guidance application may compare the keywords part of the term such as "Kate Winslet" and "dress" to the trending topics extracted by the media guidance application. From the comparison, the media guidance application may pick the topic about the auction of the "dress" that "Kate Winslet" wore in "Titanic."

In some embodiments, the media guidance application, in response to determining that the term matches a trending topic in the plurality of trending topics, identifying an additional media asset associated with the trending topic. For example, from the trending topic about the auction of "Kate Winslet", the media guidance application may determine that the trending topics discuss the movie "Titanic" that stars "Kate Winslet." Therefore, the media guidance application selects the movie "Titanic" as the additional media asset.

In response to determining that the term does not match a trending topic in the plurality of trending topics, the media guidance application may transmit the term to a knowledge graph having a plurality of nodes representing different pieces of information and a plurality of edges connecting the plurality of nodes representing relationships between the different pieces of information. In some embodiments, the knowledge graph may be stored at the database. In some embodiments, the media guidance application may identify a first node representing the term on the knowledge graph, and search, starting from the first node on the knowledge graph, for a second node representing media asset related information. For example, a knowledge graph may contain nodes that relate media assets to various elements, such as actors, objects, locations, themes, genres, among other topics. In this example, the distance between the different nodes in the knowledge graph may represent a degree of closeness between the two nodes.

The media guidance application may determine a distance between the first node and the second node, and compares the distance between the first node and the second node with a pre-defined threshold. In response to determining that the distance is below the pre-defined threshold, the media guidance application identifies a media asset relating to the media asset related information from the second node, and determines the ambiguous voice query is related to the media asset. For example, the media guidance application may determine that the distance between the node "Kate Winslet" and the node "Titanic" may be one. In such examples, the distance between the node "Titanic" and node "dress" may be 3 nodes. In such examples, if the threshold is 2 nodes, the "dress" node may not be closely related to the "Titanic" node. However, the node of "Kate Winslet" is only one node away from the node "Titanic" and therefore may determine that the node of "Kate Winslet" is related to the media asset of "Titanic."

For another example, the connected nodes of information on the knowledge graph may provide derived information from the ambiguous query, which may not be available by searching trending topics on social media or metadata of media assets. For example, the phrase "middle earth movie" may be related to "Johnny Depp" using the knowledge graph, even though the middle earth movie "middle earth movie" of "Lord of the Rings" does not actually star "Johnny Depp." In some embodiments, the structure and functioning of a knowledge graph are further disclosed in Geller et al., United States Patent Publication No. 2016/0314158, published on Oct. 27, 2016, the disclosure of which is hereby incorporated herein in its entirety.

The media guidance application, in response to determining that the ambiguous query 106 relates to the one or more media assets, may retrieve a viewing history of the user. For example, the media guidance application, may retrieve from the database, a viewing history associated with the user. From the viewing history, the media guidance application may identify a media asset that the user has viewed from the one or more media assets based on the viewing history. In some examples, the viewing history of the user may be stored at the database, and the media guidance application may receive the viewing history from the database. In such examples, the media guidance application may retrieve the actual media assets that are part of the viewing history for processing. In some embodiments, the media guidance application may retrieve the viewing history of the last week. In some embodiments, the media guidance application may only retrieve the viewing history of the particular day. In some embodiments, the media guidance application may start searching for the relevant media asset in decreasing chronological order, starting at the most recently viewed media asset first and working backwards.

In some embodiments, the media guidance application may determine that the user has watched a media asset "Titanic" starring "Kate Winslet" in the last week. In the case that there is more than one media asset starring "Kate Winslet" in the last week, the media guidance application may give a preference to the later viewed media asset first. In such examples, the media guidance application may from the viewing history of the application, select two media assets, "Titanic" and "Jobs" that both star "Kate Winslet" that the user has seen in the last week.

In some examples, the media guidance application may process each media asset that is part of the viewing history of the user to determine whether the ambiguous query 106 refers to that media asset 110. The media guidance application generates a plurality of video frames from the identified media asset. For example, the media guidance application, for each media asset, may split the media asset into a plurality of frames. The media guidance application may perform image analysis on each such frame part of the media asset to determine the objects that are part of the frame. For example, the media guidance application may perform edge detection on each frame to determine the contents of the frame. In the respective example, the media guidance application may analyze both "Titanic" and "Jobs" starring "Kate Winslet."

The media guidance application may determine whether one of the plurality of video frames contains the object indicated in the ambiguous query. For example, for each video frame, the media guidance application may compare items within the frame, e.g., using content fingerprints, to determine whether the frame contains objects that are part of the term. In such examples, the media guidance application may search for "Kate Winslet" (e.g., by facial recognition) and "dress" in each frame of the media asset. In response to determining that at least one video frame contains the object, the media guidance application may determine a media asset segment containing the at least one video frame from the media asset. The media guidance application may obtain information relating to the object and the media asset segment based at least in part on metadata corresponding to the media asset segment, and generates for display, the media asset segment containing at least one video frame and information relating to the object. For example, the media guidance application may pick out a frame of a media asset that includes "Kate Winslet," and a "dress" i.e., elements that are part of the term. From the frame-by-frame analysis, the media guidance application may determine that only "Titanic" has a dress related to "Kate Winslet" and not "Jobs." In this example, the media guidance application may select the media asset 110 as "Titanic."

Upon determining the presence of the object, the media guidance application may determine from the frame, a segment of the media asset that includes the frame of the object. In such examples, the media guidance application may determine information related to the object and display the information to the user along with the segment of the media asset that includes the object.

The media guidance application determines a start time and end time of a segment of the media asset associated with the object. In some embodiments, the media guidance application searches, starting at the beginning of the media asset, for a first video frame that contains the object and determines a starting playback position corresponding to the first video frame. In some examples, the media guidance application the media guidance application detects a starting time of the media asset and stores the starting time. In some embodiments, the media guidance application searches, for a second video frame that is a last instance in which the object continuously appears since the starting playback position, and determines an ending playback position corresponding to the second video frame. In some examples, the media guidance application detects a time of the last frame of the media asset and stores the time of the last frame.

In some embodiments, the media guidance application may determine, from the metadata corresponding to the additional media asset, a keyword associated with the object. The media guidance application may generate a search query based on the keyword, and may transmit the search query to a data source to obtain information related to the object. For example, the media guidance application may generate a query based on the keywords related to the object. In such examples, the media guidance application may determine a query using the terms "Kate Winslet," and "dress" using query identifiers. In such examples the media guidance application executes the search query over the internet to determine information 112 related to the object. In such examples, the media guidance application running a search using a query generated from terms extracted from the ambiguous query 106.

The information that is determined about the object is displayed on a user device displaying the media asset. The media guidance application determines a position of the object within the at least one video frame, and generates for display, an overlay containing the information 112 relating to the object at the position of the object. In such examples, the media guidance application may determine a position of the dress in a frame of the movie "Titanic" and may display the retrieved information regarding the dress next to the display of "Kate Winslet" and the "dress."

The media guidance application may also use additional information like user's location to filter the viewing history of the user. In some embodiments, the media guidance application may determine a location of the user at the time of the vocal conversation. For example, the media guidance application may receive a vocal conversation from the user at a particular location (e.g., "Central Park") about a media asset that was shot there. The media guidance application may determine the location of the user from the device the user is using for recording the conversation. In some embodiments, the media guidance application adds the determined location of the user to the term to generate a second term. In such examples, the media guidance application generates a second query that includes the location.

The media guidance application may filter the plurality of media assets based on the second term.

The media guidance application, may determine that the object described in the media guidance application may already be in possession of the user, and in order to more clearly identify the object, may provide an image of the object in possession along with the object. In some embodiments, upon identifying an object from an ambiguous query, e.g., "the dress Kate Winslet is wearing," the media guidance application may identify and/or compare with the identified object with an item that the user possesses and is similar to the identified object. Specifically, the media guidance application may determine from a profile associated with the user, that a second object that is related to the user, wherein the second object shares a common attribute with the object, the media guidance application searches through user generated media in a period of time to retrieve a set of media that corresponds to the second object. The media guidance application performs an image comparison between the set of media that corresponds to the second object and the object, and generates for display, a comparative view of the second object and the object. For example, the media guidance application may determine that the object that is determined may be already purchased by the user previously. In such examples, the media guidance application may determine from a purchase history associated with the user that the user has purchased the object. When the media guidance application determines that the user has purchased the object, the media guidance application generates a comparative view of the object purchased by the user and the object shown in the media asset. In some examples, the media guidance application may search through the purchases made by the user to determine whether the user purchased a dress that is similar to the "dress" that "Kate Winslet" wore in the movie "Titanic." In response to determining that the user purchased that dress, the media guidance application may provide the user a picture of the "dress" alongside a picture of the dress purchased by the user to compare. In some embodiments, the media guidance application, may perform image analysis on the user's personal media to determine whether the user contains a picture or a video that features the object or a version of the object purchased by the user. The media guidance application may display this image or video of the object possessed by the user along with the media asset 110 as part of information 112. In this way, the media guidance application may parse ambiguous queries provided by the user and based on the queries, suggest media assets and objects related to the media assets that may be of interest to the user.

In some aspects, the media guidance application may provide a search result in response to an ambiguous voice query based on content analysis of media assets that a user has been exposed to. The media guidance application may detect, an ambiguous query indicative of an object of interest to the user. For example, the media guidance application, while running on a user device, may receive a query from a user of the form "Tell me about Leonardo DiCaprio's car". In some examples, the media guidance application may receive a stream of conversation from a user associated with the media guidance application and may filter the stream of conversation to detect a query directed at the media guidance application. In some examples, the media guidance application may detect that the user is having a conversation with a different user. The media guidance application may ask the user whether the user would like to see the result of the query on user equipment device 102.

In order to determine a context of the ambiguous query, the media guidance application may split the ambiguous query into a plurality of terms. For example, the media guidance application may split the query "Tell me about Leonardo DiCaprio's car" into "Leonardo DiCaprio", "car", and "tell".

These terms may then be compared to entries in a database to determine whether they correspond to an object identifier. The media guidance application may determine whether a term in the plurality of terms matches an entry in a plurality of entries that are stored at a data source, wherein each entry in the plurality of entries comprises a term of the plurality of terms and a corresponding object identifier. For example, the media guidance application may compare the terms "Leonardo DiCaprio", "car", and "tell" to a database to determine object identifiers associated with such terms. In this example, the term "car" may have an object identifier of "vehicle" associated with it. Similarly, the term "tell" may have the identifier "search" associated with it.

Using the identifiers, the media guidance application may convert the ambiguous natural language query received from the user to a a computer system query for processing. The media guidance application may generate a query of the object, wherein the query includes object identifiers of entries that match terms in the plurality of terms. In such examples, the media guidance application may generate a query "search Leonardo DiCaprio vehicle" from the ambiguous query. In some embodiments, the media guidance application may generate a set of keywords that may be used as search terms, when searching the data source. In some embodiments, the media guidance application may determine from the ambiguous query, how the user wishes to receive an answer to their query. For example, if the user says "show", the media guidance application may display the result of the query on user equipment device 102. Similarly, if the user says, "tell me", the media guidance application may recite the answer to the user via user equipment device 102 or remote assistant device 108.

The media guidance application may transmit the query to a data source. The data source may contain metadata associated with media assets that are available. In some examples, the data source may be a database provided by a service provider (e.g. Amazon video, Netflix, Time Warner) that includes media assets. The media guidance application may transmit the query to the data source. The media guidance application may prompt the data source to search through the metadata of available media assets to determine whether the metadata includes terms related to "Leonardo DiCaprio" and "vehicle". In some examples, the data source may be stored along with the media guidance application. In some embodiments, the media guidance application may send the queries to a remote server that includes a data storage.

After the searching, the media guidance application may receive results of the search from the datastore. The media guidance application may receive, from the data source, a result of the query, wherein the result includes media asset identifiers. The result of the query may include identifiers of media assets, that contain metadata that matches the terms of the query generated and transmitted by the media guidance application. For example, the media guidance application may receive from the data store, identifiers for the movies "Titanic", "The Great Gatsby", "Wolf of Wall Street", and "Revenant".

Using the results from the data store, the media guidance application may determine whether the query was related to a media asset. In such examples, if the query media guidance application does not receive any media asset identifiers as part of the results, the media guidance application may determine that the query is not related to a media asset. The media guidance application may determine, based on the result of the query, whether the ambiguous query relates to one or more media assets. For example, on receiving the identifiers for the movies "Titanic", "The Great Gatsby", "Wolf of Wall Street", and "Revenant", the media guidance application may determine that the query is related to a media asset.

Upon determining that the query relates to a media asset, the media guidance application will search through the user's history to determine whether the user has viewed any media asset related to the query. The media guidance application, in response to determining that the ambiguous query relates to the one or more media assets, retrieving a viewing history of the user, determining whether the viewing history includes any of the one or more media assets. For example, the media guidance application may search the user's viewing history to determine whether the user has watched any of "Titanic", "The Great Gatsby", "Wolf of Wall Street", and "Revenant".

In some embodiments, the media guidance application may not receive any media assets as part of the search result. In such embodiments, the media guidance application may search through a profile associated with a user for the object associated with the ambiguous query. In such embodiments, the media guidance application may, from the profile associated with the user, determine a social network associated with the user and search the social network associated with the user using the keywords generated.

Upon determining that the user has watched any one of the media assets, the media guidance application may focus the search of the object of the query in the media asset viewed by the user. In response to determining that the that the viewing history includes any of the one or more media assets, the media guidance application may determine from the viewing history, a media asset that is part of the one or more media assets. For example, the media guidance application may determine that the user has viewed "The Great Gatsby" from the list of search results.

The media guidance may search, each frame of the media asset for the object, determine, based on the searching, a plurality of frames that include the object. For example, the media guidance application may search through each frame of the movie "The Great Gatsby" for "Leonardo DiCarpio" and a "car". In some examples, Leonardo DiCaprio may be driving a car, in some other examples, he just may be sitting in a car.

Using the segments of Leonardo DiCaprio and car from "The Great Gatsby", the media guidance application may form a segment of the movie. The media guidance application may form, based on the determined plurality of frames, a segment of the media asset that includes the object, and generate for display, an indication of the segment of the media asset segment containing the object.

In some embodiments, the media guidance application may determine, from metadata associated with the media asset, information associated with the object. In some embodiments, the media guidance application may determine information associated with the media asset on the internet using the generated keywords. In such embodiments, the media guidance application may display the information related to the media asset along with the segment of the media asset on user equipment device 102.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
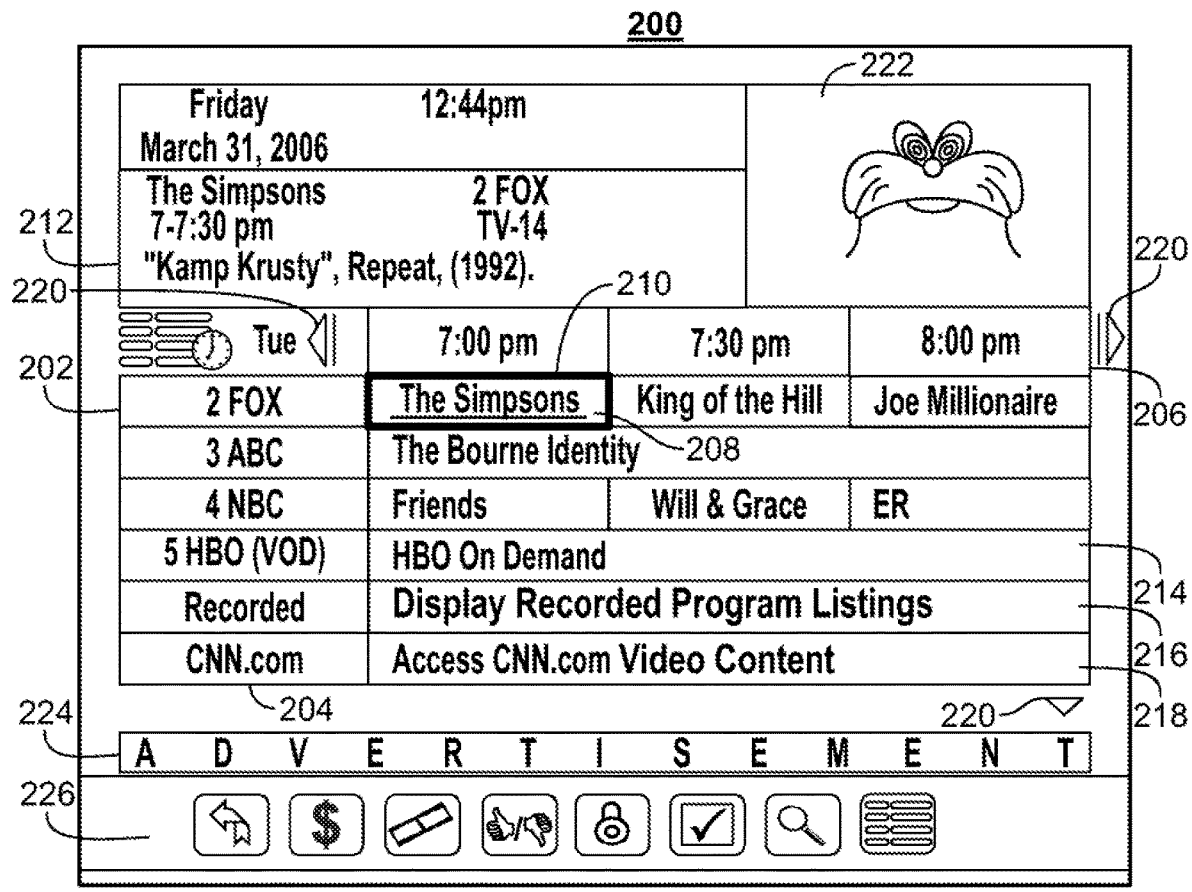
FIG. 2 shows an illustrative embodiment of a display screen that may be used to provide media guidance application listings and other media guidance information, in accordance with some embodiments of the disclosure.
Figure 3:
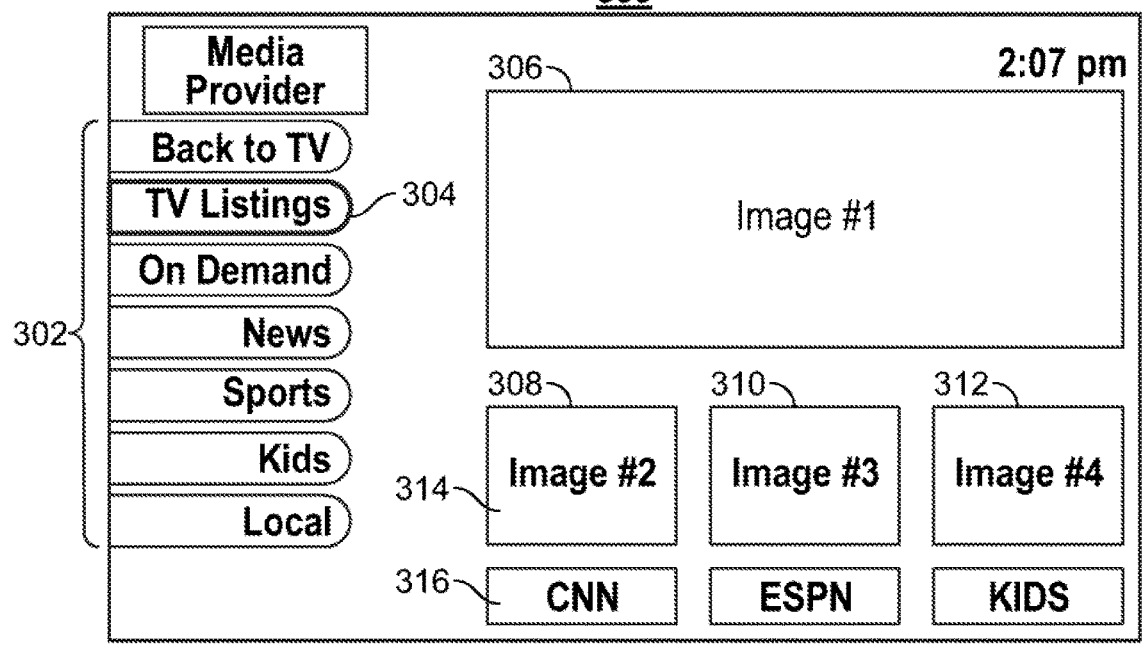
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
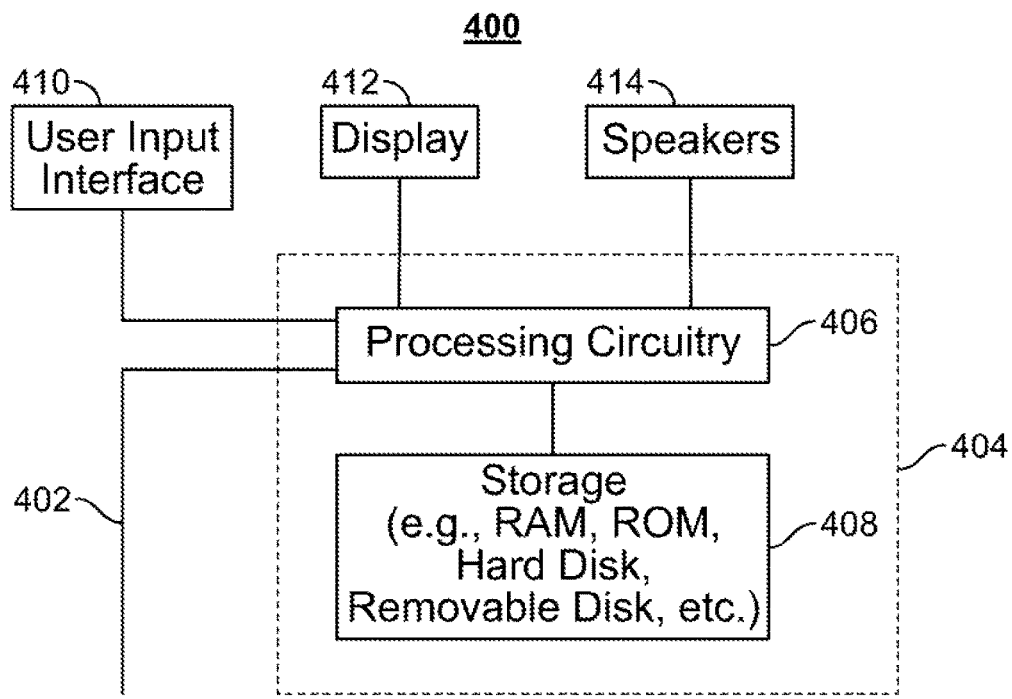
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
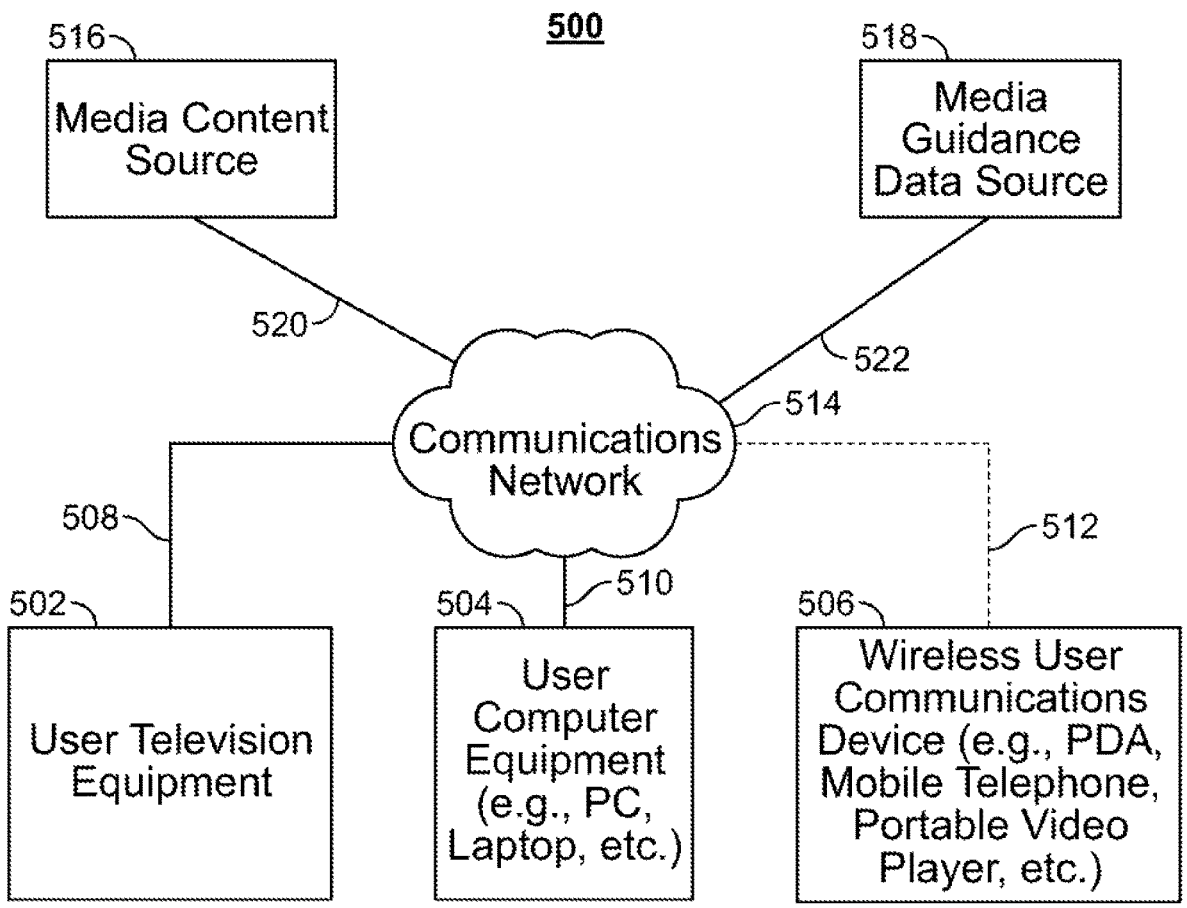
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively.

Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
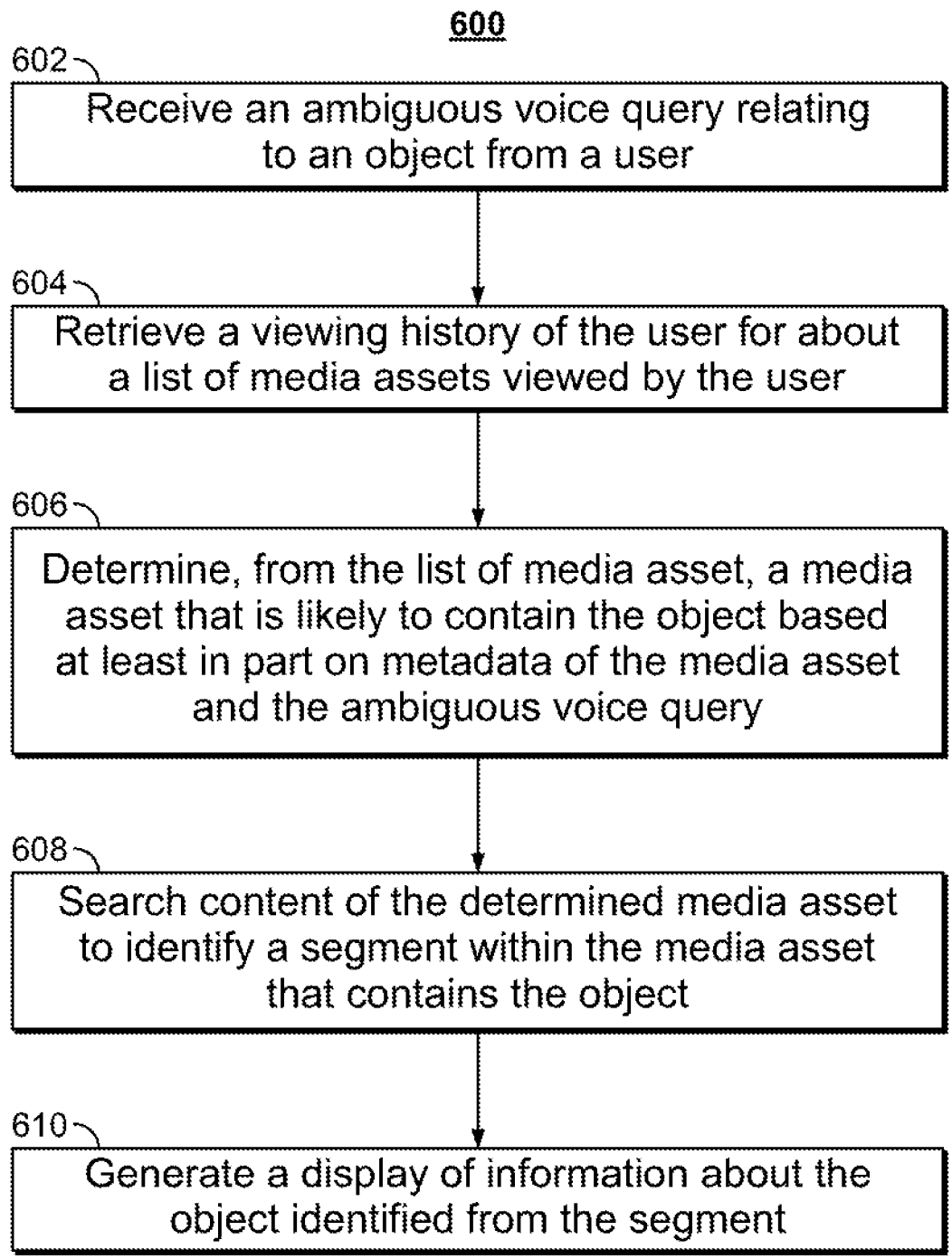
FIG. 6 is a flowchart of a detailed illustrative process for generating an audio/visual responding to an ambiguous query, in accordance with some embodiments of the disclosure.

FIG. 6 is a flowchart of a detailed illustrative process for generating an audio/visual responding to an ambiguous query, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 7-10). Many elements of process 600 have been described above with respect to FIG. 1, and those descriptions have full force and effect with respect to the below description of process 600, and thus details on previously-described elements are omitted for the sake of brevity.

Process 600 begins at 602 where control circuitry 404 receives an ambiguous voice query 106 relating to an object from a user monitoring a vocal conversation 106 at a user equipment device 102. At 604, control circuitry 404 retrieves a viewing history, from storage 408, of the user 104 for about a list of media assets viewed by the user on user equipment device 102. At 606, control circuitry 404 determines, from the list of media asset, a media asset 110 that is likely to contain the object based at least in part on metadata of the media asset and the ambiguous voice query. At 608, control circuitry 404 searches content of the determined media asset 110 to identify a segment within the media asset that contains the object. At 610, control circuitry 404 generates a display of information about the object identified from the segment for display on user equipment device 102.

Figure 7:
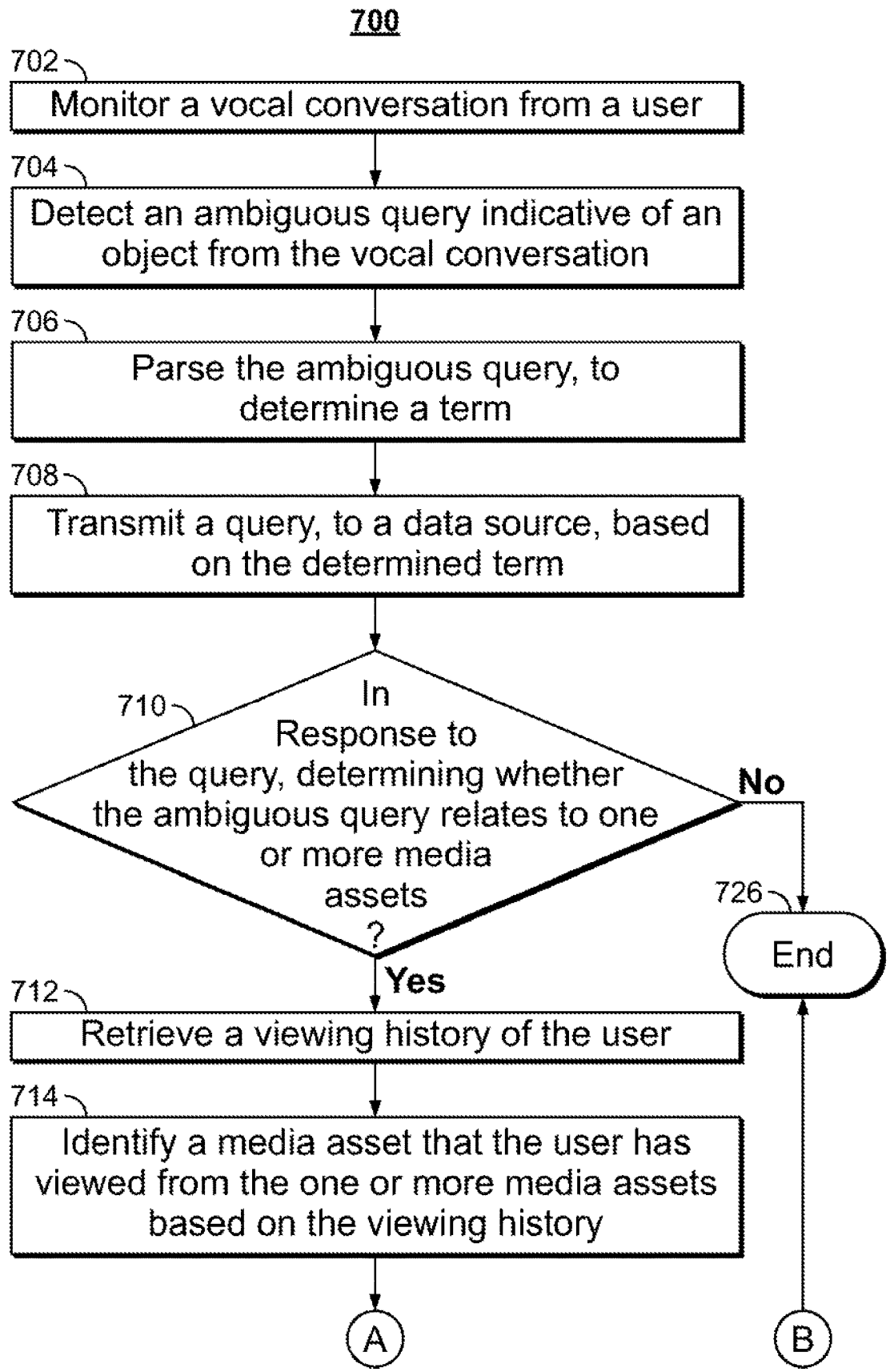
FIG. 7 is a flowchart of a detailed illustrative process for generating an audio/visual responding to an ambiguous query, in accordance with some embodiments of the disclosure.
Figure 7:
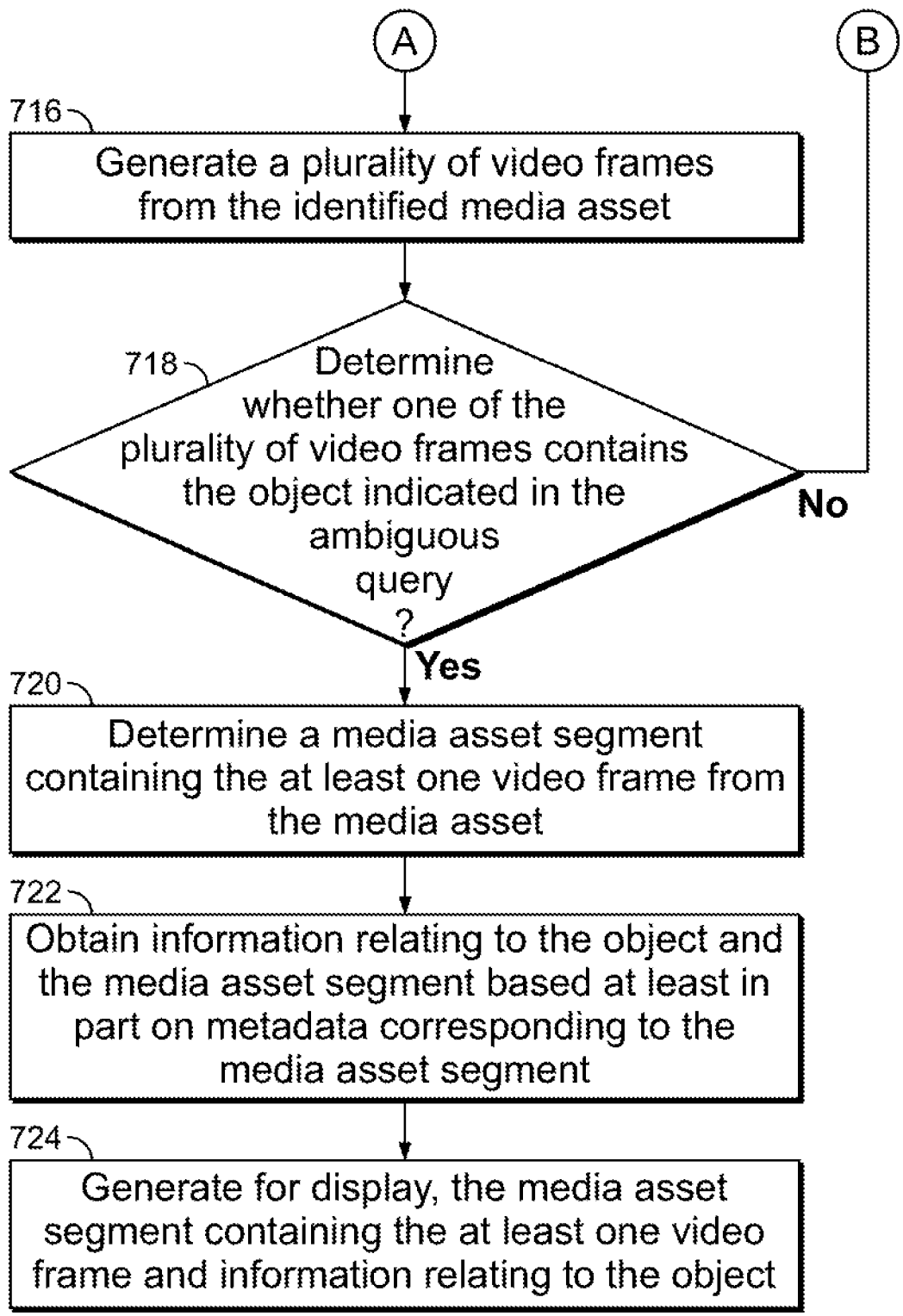

FIG. 7 is a flowchart of a detailed illustrative process for generating an audio/visual responding to an ambiguous query, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 700 may be incorporated into or combined with one or more steps of any other process or embodiment (e.g., as described in relation to FIGS. 6 and 8-10). Many elements of process 700 have been described above with respect to FIG. 1, and those descriptions have full force and effect with respect to the below description of process 700, and thus details on previously-described elements are omitted for the sake of brevity.

Process 700 begins at 702 where control circuitry 404 monitors a vocal conversation from a user 104 received at user equipment device 102. At 704, control circuitry 404 detects an ambiguous query 106 indicative of an object from the vocal conversation received at user equipment device 102. At 706, control circuitry 404 parses the ambiguous query, to determine a term. At 708, control circuitry 404 transmits a query, to a data source at storage 408, based on the determined term. At decision block 710, in response to the query, control circuitry 404 determines whether the ambiguous query 106 relates to one or more media assets. In response to determining that the ambiguous query 106 relates to one or more media assets, control circuitry 404 proceeds process 700 to 712 to retrieve, from storage 408, a viewing history of the user. In response to determining that the ambiguous query 106 does not relate to one or more media assets, control circuitry 404 proceeds process 700 to end at 726. At 714, control circuitry 404 identifies a media asset 110 that the user has viewed from one or more media assets based on the viewing history. At 716, control circuitry 404 generates a plurality of video frames from the identified media asset 110. At decision block 718, control circuitry 404 determines whether one of the plurality of video frames contains the object indicated in the ambiguous query 106. In response to determining that one of the plurality of video frames contains the object indicated in the ambiguous query 106, control circuitry 404 proceeds process 700 to 720 to determine a media asset segment containing at least one video frame from the media asset 110. At 722, control circuitry 404 obtains information relating to the object and the media asset segment based at least in part on metadata corresponding to the media asset segment. At 724, control circuitry 404 generates for display, on a display 412 of user equipment device 102, the media asset segment containing at least one video frame and information 112 relating to the object.

Figure 8:
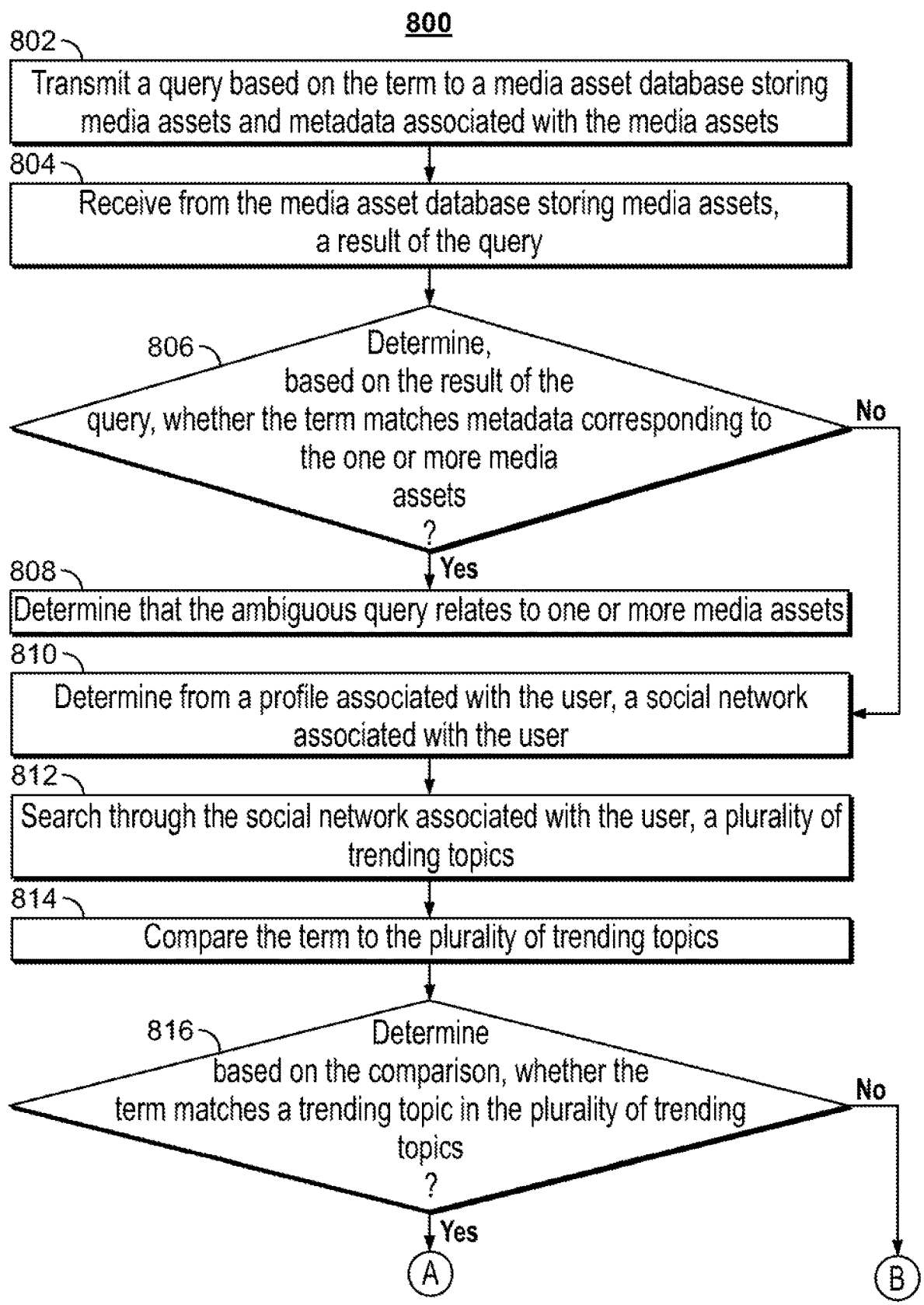
FIG. 8 is a flowchart of a detailed illustrative process for determining a media asset related to the ambiguous query, in accordance with some embodiments of the disclosure.
Figure 8:
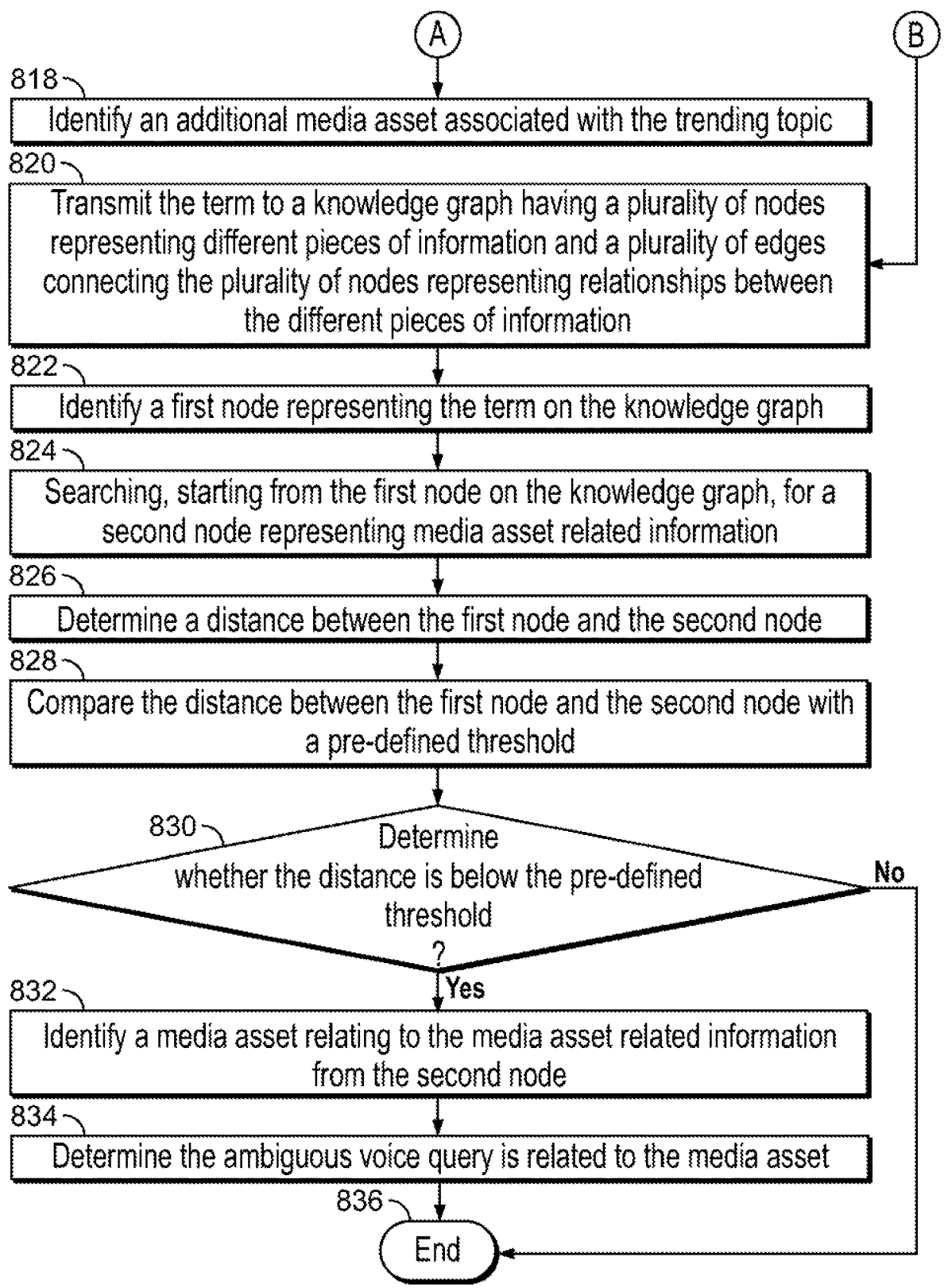

FIG. 8 is a flowchart of a detailed illustrative process for determining a media asset related to the ambiguous query, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 800 may be incorporated into or combined with one or more steps of any other process or embodiment (e.g., as described in relation to FIGS. 6-7 and 9-10). Many elements of process 800 have been described above with respect to FIG. 1, and those descriptions have full force and effect with respect to the below description of process 800, and thus details on previously-described elements are omitted for the sake of brevity.

Process 800 begins at 802 where control circuitry 404 transmits a query 106 based on the term to a media asset database storing media assets and metadata associated with the media assets, at storage 408. At 804, control circuitry 404 receives from the media asset database storing media assets, a result of the query 106. At decision block 806, control circuitry 404 determines, based on the result of the query 106, whether the term matches metadata corresponding to one or more media assets. In response to determining that the term matches metadata corresponding to one or more media assets, control circuitry 404 proceeds process 800 to 808 to determine that the ambiguous query 106 relates to one or more media assets. In response to determining that the term does not match metadata corresponding to one or more media assets, control circuitry 404 proceeds process 800 to 810 to determine from a profile associated with the user, a social network associated with the user 104. At 812, control circuitry 404 searches through the social network associated with the user, a plurality of trending topics. At 814, control circuitry 404 compares the term to the plurality of trending topics. At decision block 816, control circuitry 404 determines based on the comparison, whether the term matches a trending topic in the plurality of trending topics. In response to determining that the term matches a trending topic in the plurality of trending topics, control circuitry 404 proceeds process 800 to 818 to identify an additional media asset associated with the trending topic. In response to determining that term does not match a trending topic in the plurality of trending topics, control circuitry 404 proceeds process 820 to transmit the term to a knowledge graph, stored at storage 408, having a plurality of nodes representing different pieces of information and a plurality of edges connecting the plurality of nodes representing relationships between the different pieces of information. At 822, control circuitry 404 identifies a first node representing the term on the knowledge graph. At 824, control circuitry 404 searches, starting from the first node on the knowledge graph, for a second node representing media asset related information. At 826, control circuitry 404 determines a distance between the first node and the second node. At 828, control circuitry 404 compares the distance between the first node and the second node with a pre-defined threshold. At decision block 830, control circuitry 404 determines whether the distance is below the pre-defined threshold. In response to determining that the distance is below the pre-defined threshold, control circuitry 404 proceeds process 800 to 832 to identify a media asset relating to the media asset related information from the second node. In response to determining that the distance is not below the pre-defined threshold, control circuitry 404 proceeds process 800 to end at 836. At 834, control circuitry 404 determines the ambiguous voice query 106 is related to the media asset 110.

Figure 9:
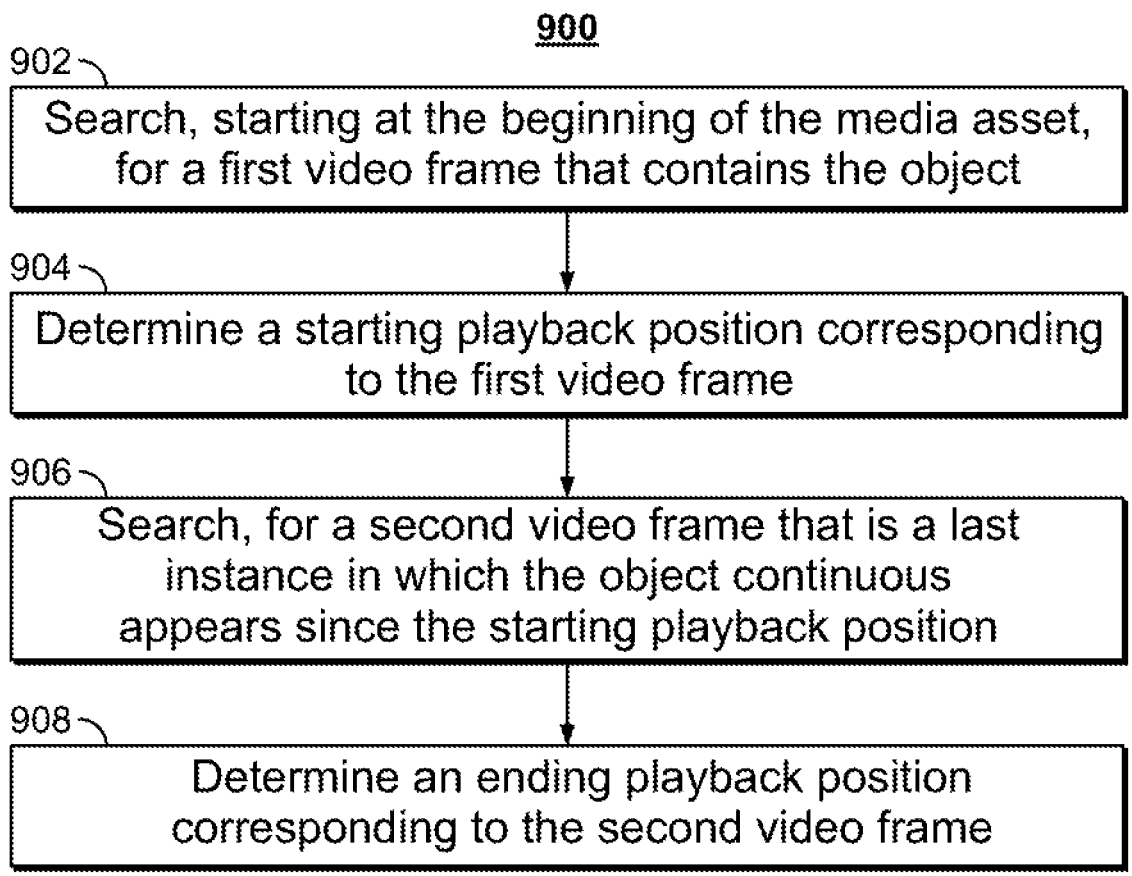
FIG. 9 is a flowchart of a detailed illustrative process for determining a starting position and an ending position of a segment of a media asset containing the object, in accordance with some embodiments of the disclosure.

FIG. 9 is a flowchart of a detailed illustrative process for determining a starting position and an ending position of a segment of a media asset containing the object, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 900 may be incorporated into or combined with one or more steps of any other process or embodiment (e.g., as described in relation to FIGS. 6-8 and 10-13). Many elements of process 900 have been described above with respect to FIG. 1, and those descriptions have full force and effect with respect to the below description of process 900, and thus details on previously-described elements are omitted for the sake of brevity.

Process 900 starts at 902 where control circuitry 404 searches, starting at the beginning of the media asset 110, for a first video frame that contains the object. At 904, control circuitry 404 determines a starting playback position corresponding to the first video frame of media asset 110. At 906, control circuitry 404 searches, for a second video frame that is a last instance in which the object continuously appears since the starting playback position of media asset 110. At 908, control circuitry 404 determines an ending playback position corresponding to the second video frame.

Figure 10:
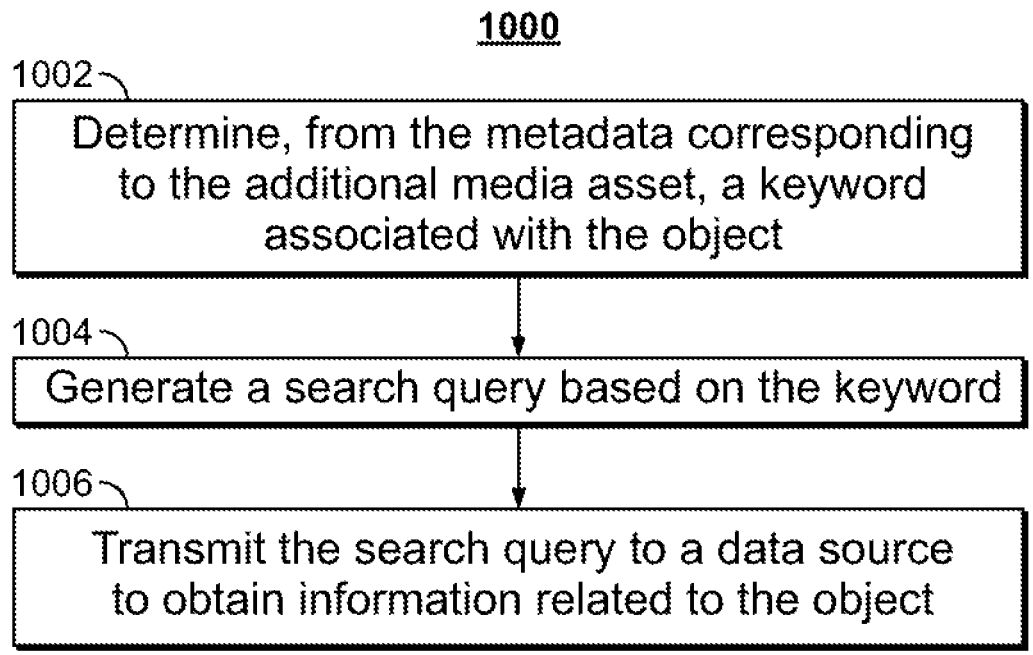
FIG. 10 is a flowchart of a detailed illustrative process for determining information related to the object, in accordance with some embodiments of the disclosure.

FIG. 10 is a flowchart of a detailed illustrative process for determining information related to the object, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1000 may be incorporated into or combined with one or more steps of any other process or embodiment (e.g., as described in relation to FIGS. 6-9 and 11-13). Many elements of process 1000 have been described above with respect to FIG. 1, and those descriptions have full force and effect with respect to the below description of process 900, and thus details on previously-described elements are omitted for the sake of brevity.

Process 1000 begins at 1002 where control circuitry 404 determines, from the metadata corresponding to the additional media asset, a keyword associated with the object. At 1004, control circuitry 404 generates a search query based on the keyword. At 1006, control circuitry 1006 transmits the search query to a data source at storage 408, to obtain information 112 related to the object.

Figure 11:
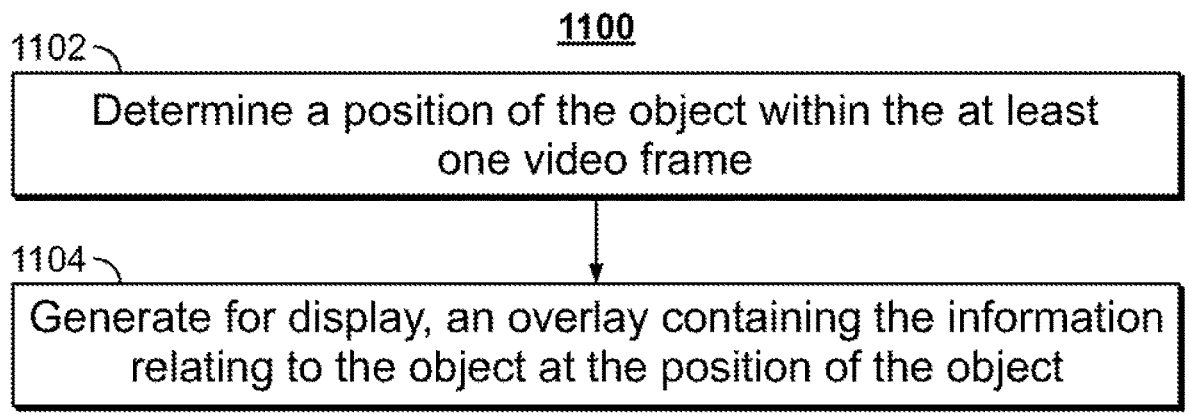
FIG. 11 is a flowchart of a detailed illustrative process for generating an overlay for displaying information related to the object, in accordance with some embodiments of the disclosure.

FIG. 11 is a flowchart of a detailed illustrative process for generating an overlay for displaying information related to the object, in accordance with some embodiments of the disclosure. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1100 may be incorporated into or combined with one or more steps of any other process or embodiment (e.g., as described in relation to FIGS. 6-10 and 12-13). Many elements of process 1000 have been described above with respect to FIG. 1, and those descriptions have full force and effect with respect to the below description of process 1100, and thus details on previously-described elements are omitted for the sake of brevity.

Process 1100 begins at 1102 where control circuitry 404 determines a position of the object within at least one video frame of media asset 110. At 1104, control circuitry 404 generates for display, an overlay containing the information 112 relating to the object at the position of the object in a frame of media asset 110.

Figure 12:
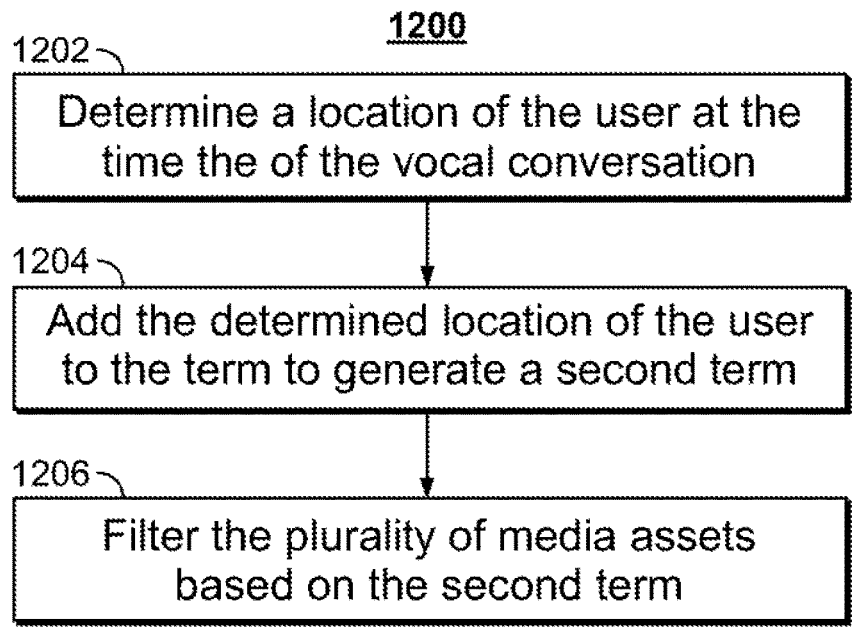
FIG. 12 is a flowchart of a detailed illustrative process for generating a second term including a location of the user, in accordance with some embodiments of the disclosure.

FIG. 12 is a flowchart of a detailed illustrative process for generating a second term including a location of the user, in accordance with some embodiments of the disclosure. It should be noted that process 1200 or any step thereof could be performed on, or provided by, any of the devices shown in FIGS. 4-5. For example, process 1200 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1200 may be incorporated into or combined with one or more steps of any other process or embodiment (e.g., as described in relation to FIGS. 6-11 and 13). Many elements of process 1200 have been described above with respect to FIG. 1, and those descriptions have full force and effect with respect to the below description of process 1200, and thus details on previously-described elements are omitted for the sake of brevity.

Process 1200 starts at 1202 where control circuitry 404 determines a location of the user at the time of the vocal conversation from a wireless user communications device 506. At 1204, control circuitry 404 adds the determined location of the user to the term to generate a second term. At 1206, control circuitry 404 filters the plurality of media assets, sored at storage 408 based on the second term.

Figure 13:
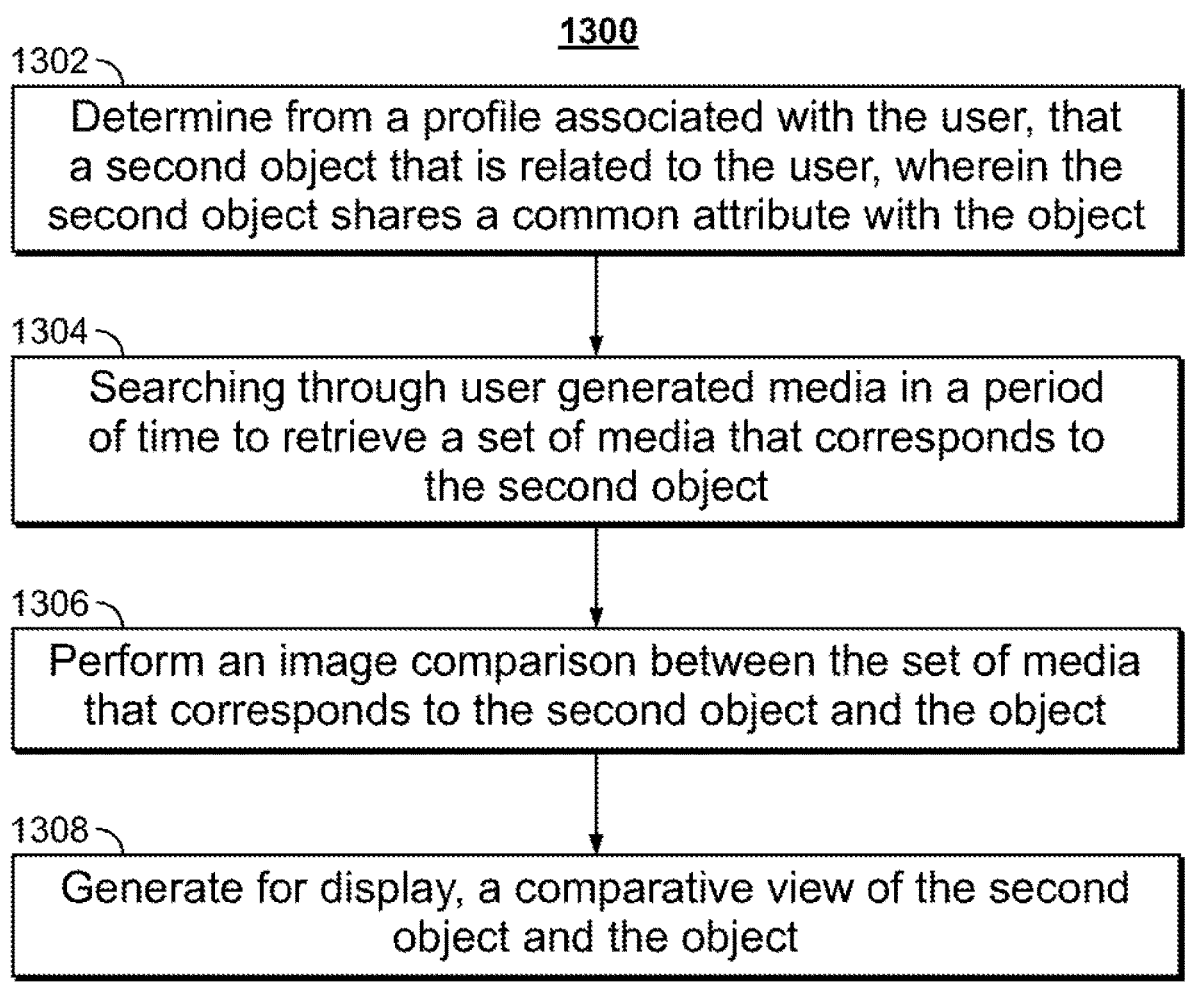
FIG. 13 is a flowchart of a detailed illustrative process for generating a comparative view of an object and a related second object, in accordance with some embodiments of the disclosure.

FIG. 13 is a flowchart of a detailed illustrative process for generating a comparative view of an object and a related second object, in accordance with some embodiments of the disclosure. It should be noted that process 1300 or any step thereof could be performed on, or provided by, any of the devices shown in FIGS. 4-5. For example, process 1000 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1300 may be incorporated into or combined with one or more steps of any other process or embodiment (e.g., as described in relation to FIGS. 6-12). Many elements of process 1300 have been described above with respect to FIG. 1, and those descriptions have full force and effect with respect to the below description of process 1300, and thus details on previously-described elements are omitted for the sake of brevity.

Process 1300 begins at 1302 where control circuitry 404 determines from a profile, stored at storage 408, associated with the user, that a second object that is related to the user, wherein the second object shares a common attribute with the object. At 1304, control circuitry 404 searches through user generated media, stored at storage 408, in a period of time to retrieve a set of media that corresponds to the second object. At 1306, control circuitry 404 performs an image comparison between the set of media that corresponds to the second object and the object. At 1308, control circuitry 404 generates for display, a comparative view of the second object and the object on a display 412 of user equipment device 102.

For the purposes of the flowcharts described in FIGS. 6-13, the object refers to the "dress" described in ambiguous query 106 of FIG. 1. And the voice conversation refers to the conversation of a user 104, monitored by control circuitry 404 running on user equipment device 102 or remote assistant device 108, from which ambiguous query 106 is determined.

What is claimed is:

1. A method for providing a search result based on an ambiguous voice query, comprising:
receiving an ambiguous voice query relating to an object from a user;
retrieving a viewing history of the user, wherein the viewing history comprises a list of media assets viewed by the user;
determining, from the list of media assets, that none of the media assets in the list of media assets are likely to contain the object based at least in part on metadata of the media assets and the ambiguous voice query; and in response to determining that none of the media assets in the list of media assets are likely to contain the object:
   determining from a profile associated with the user, a social network associated with the user;
   searching, through the social network associated with the user, a plurality of trending topics;
   comparing a term parsed from the ambiguous voice query to the plurality of trending topics;
   determining based on the comparison, that the term matches a trending topic in the plurality of trending topics;
   identifying an additional media asset associated with the trending topic;
   searching content of the additional media asset to identify a segment within the additional media asset that contains the object; and
   generating a display of information about the object identified from the segment.

2. The method of claim 1, wherein determining, from the list of media assets, that none of the media assets in the list of media assets are likely to contain the object based at least in part on metadata of the media assets and the ambiguous voice query comprises:
   transmitting a query based on the term to a media asset database storing media assets and metadata associated with the media assets;
   receiving from the media asset database storing media assets, a result of the query; and
   determining, based on the result of the query, that the term does not match metadata corresponding to any of the media assets in the list of media assets.

3. The method of claim 1, wherein searching content of the additional media asset to identify the segment within the additional media asset that contains the object comprises:
   searching, starting at the beginning of the additional media asset, for a first video frame that contains the object;
   determining a starting playback position corresponding to the first video frame;
   searching, for a second video frame that is a last instance in which the object continuously appears since the starting playback position; and
   determining an ending playback position corresponding to the second video frame.

4. The method of claim 1, further comprising:
   determining, from metadata corresponding to the additional media asset, a keyword associated with the object;
   generating a search query based on the keyword; and
   transmitting the search query to a data source to obtain information related to the object.

5. The method of claim 1, wherein generating the display of information about the object identified from the segment comprises:
   determining a position of the object within at least one video frame of the additional media asset; and
   generating for display, an overlay containing the information about the object at the position of the object.

6. The method of claim 1, further comprising:
   determining from the profile associated with the user, that a second object that is related to the user, wherein the second object shares a common attribute with the object;
   searching through user generated media in a period of time to retrieve a set of media that corresponds to the second object;
   performing an image comparison between the set of media that corresponds to the second object and the object; and
   generating for display, a comparative view of the second object and the object.

7. A system for providing a search result based on an ambiguous voice query, comprising:
   a user input interface configured to receive an ambiguous voice query relating to an object from a user; and
   control circuitry configured to:
   retrieve a viewing history of the user, wherein the viewing history comprises a list of media assets viewed by the user;
   determine, from the list of media assets, that none of the media assets in the list of media assets are likely to contain the object based at least in part on metadata of the media assets and the ambiguous voice query; and
   in response to determining that none of the media assets in the list of media assets are likely to contain the object:
      determine from a profile associated with the user, a social network associated with the user;
      search, through the social network associated with the user, a plurality of trending topics;
      compare a term parsed from the ambiguous voice query to the plurality of trending topics;
      determine based on the comparison, that the term matches a trending topic in the plurality of trending topics;
      identify an additional media asset associated with the trending topic;
      search content of the additional media asset to identify a segment within the additional media asset that contains the object; and
      generate a display of information about the object identified from the segment.

8. The system of claim 7, wherein the control circuitry is configured to determine, from the list of media assets, that none of the media assets in the list of media assets are likely to contain the object based at least in part on metadata of the media assets and the ambiguous voice query by:
   transmitting a query based on the term parsed to a media asset database storing media assets and metadata associated with the media assets;
   receiving from the media asset database storing media assets, a result of the query; and
   determining, based on the result of the query, that the term does not match metadata corresponding any of the media assets in the list of media assets.

9. The system of claim 7, wherein the control circuitry is configured to search content of the additional media asset to identify the segment within the additional media asset that contains the object by:
   searching, starting at the beginning of the additional media asset, for a first video frame that contains the object;
   determining a starting playback position corresponding to the first video frame;
   searching, for a second video frame that is a last instance in which the object continuously appears since the starting playback position; and
   determining an ending playback position corresponding to the second video frame.

10. The system of claim 7, the control circuitry further configured to:
   determine, from metadata corresponding to the additional media asset, a keyword associated with the object;

generate a search query based on the keyword; and transmit the search query to a data source to obtain information related to the object.

11. The system of claim 7, wherein the control circuitry is configured to generate the display of information about the object identified from the segment by:

determining a position of the object within at least one video frame of the additional media asset; and generating for display, an overlay containing the information about the object at the position of the object.

12. The system of claim 7, the control circuitry further configured to:

determine from the profile associated with the user, that a second object that is related to the user, wherein the second object shares a common attribute with the object;

search through user generated media in a period of time to retrieve a set of media that corresponds to the second object;

perform an image comparison between the set of media that corresponds to the second object and the object; and generate for display, a comparative view of the second object and the object.

13. The method of claim 1, wherein the list of media assets does not comprise the additional media asset.

14. The system of claim 7, wherein the list of media assets does not comprise the additional media asset.

* * * * *